United States Patent Office 3,759,857
Patented Sept. 18, 1973

3,759,857
CROSS LINKING OF ACRYLAMIDE POLYMERS
William J. I. Bracke, Brussels, Belgium, assignor to Labofina S.A.
No Drawing. Filed June 18, 1971, Ser. No. 154,607
Claims priority, application Great Britain, June 23, 1970, 30,444/70
Int. Cl. C08f 3/90, 45/24
U.S. Cl. 260—29.6 H                    12 Claims

ABSTRACT OF THE DISCLOSURE

A process for the cross-linking of polymers of acrylamide comprising treating an aqueous solution of said polymers at a temperature of from 0° C. to 100° C. with an aqueous solution of a salt selected from the group consisting of the hypochlorite and hypobromite salts of alkali metals and alkaline-earth metals.

BACKGROUND OF THE INVENTION

This invention relates to a process for the crosslinking of polymers of acrylamide, with the formation of stable gels. The invention further relates to a process for the cross linking of polymers of acrylamide in the presence of solid particulate material to form stable aggregates or agglomerates of such material.

Some known processes have been suggested for producing cross linked polymers of acrylamide, but they require the copolymerisation of acrylamide in the presence of another monomer, such as an alkylidene-bis-acrylamide, by means of which the cross-linking is performed, or they require a long heating operation, and the presence of suitable additives. These different processes are uneconomic and have few uses.

An object of the present invention is to provide a simple and economical process for the cross-linking of polymers of acrylamide. Another object of the present invention is to carry out this cross-linking in the presence of particulate materials. A further object of this invention is to carry out this cross-linking process in the presence of particulate materials in order to produce stable agglomerates.

SUMMARY OF THE INVENTION

According to the present invention there is provided a process for cross-linking of a polymer of acrylamide comprising treating an aqueous solution of said polymer at a temperature of from 0° to 100° C. with an aqueous solution of a hypochlorite or hypobromite salt of an alkali or alkali earth metal.

According to an embodiment of the present invention, the pH of the hypochlorite or hypobromite aqueous solution is in the range of from 5 to 11.

According to a further aspect of the invention there is provided a process for the agglomeration of particulate material comprising mixing with said material an aqueous solution of an acrylamide polymer and an aqueous solution containing from 0.5% to 10% by weight of a hypochlorite or hypobromite salt of an alkali metal or alkali earth metal, the amount of solution of acrylamide polymer corresponding to from 0.5 to 50 parts by weight of acrylamide polymer per 1000 parts by weight of particulate material, and the weight ratio of active hypochlorite or hypobromite to acrylamide polymer being from 1 to 20, all weight ratios based on dry basis.

In fact, the process of the present invention is flexible, so that it is possible to agglomerate solid particles of widely different kinds, such as sand, clay, asbestos, coal dust, wood flour and glass fibres, for the purpose of producing agglomerates having a variety of structures. This process can thus be used for applications such as the solidification of soils for the construction of buildings or runways, well drilling, tunnel construction, dune or soil structure stabilisation, shell moulding.

DESCRIPTION OF THE PREFERRED EMBODIMENTS

The terms "acrylamide polymer" or "polyacrylamide" used hereinabove and throughout the following description are to be understood to cover both the homopolymers of acrylamide, and copolymers based on acrylamide, such as those of acrylamide copolymerised with a monomer or monomers chosen from acrylic acid, methacrylic acid, the esters of acrylic and methacrylic acid, acrylonitrile and/or other vinylic or polyolefinic monomers. Generally the acrylamide polymer has a molecular weight in the range of from 50,000 to 1,500,000; higher molecular weights producing excessively viscous aqueous solutions.

The salt of hypochlorous or hypobromous acid may be a salt of an alkali metal or alkali earth metal. The selection of this salt depends primarily on economic factors, since different salts may be equally active. Sodium hypochlorite is preferably used. Other factors can intervene in the selection of the salt; however, potassium, or calcium salts provide metal ions which may be advantageous when the process of the invention is carried out to stabilise agricultural soils. The term "hypochlorites and hypobromites" used hereinabove and throughout the following description are to be understood to cover also the hypochlorite and hypobromite generating compounds, such as water-soluble lower chloramines and the chlorocyanurates which may be used instead of hypochlorites.

Suitably the aqueous salt solution contains from 0.5% to 10% and preferably from 1 to 3% by weight of active hypochlorite or hypobromite. A pronounced reduction in the degree of cross-linking of the acrylamide polymer is observed if the concentration of the active hypochlorite or hypobromite in the aqueous solution of the salt exceeds 10% by weight.

Preferably the pH of the aqueous salt solution is from 6 to 10.5 with excessively acid solutions chlorine is released, and with excessively alkaline solutions ammonia is released when the solutions are mixed with the solution of acrylamide polymer.

The weight ratio between the acrylamine polymer calculated on dry basis and active hypochlorite or hypobromite is preferably from 1 to 20 and more preferably from 10 to 20. Greater amounts of hypochlorite or hypobromite than those corresponding to this ratio do not result in any improvement of the degree of cross-linking of the polymer.

The process described hereinabove renders it possible, at temperatures of from 0° to 100° C., suitably at ambient temperature i.e. 10° C. to 30° C., to produce cross linked acrylamide polymers within a relatively short period of time, a polymer gel being normally formed after 5 to 10 minutes. The result is surprising, since it was well known that the alkali metal hypochlorites cause degradation of polyacrylamides and a conversion into polyvinylamines.

The process of the present invention is easily carried out and can be employed in particular for the solidification or stabilisation of soils and, generally, for the aggregation of agglomeration of particles into bulkier aggregates.

When employing the process of the present invention for the agglomeration of particulate material, the concentration of the aqueous solution of acrylamide polymer as well as the quantity of solution to be employed, depend on several factors, in particular on the type of agglomerate of particles required. Generally the solution of acrylamide polymer contains from 1% to 10% by weight of acrylamide polymer; more concentrated solutions are too viscous and difficult to spread over the particles, whereas excessively diluted solutions result in the presence of an unnecessary amount of water. Preferably the solution of acrylamide polymer contains from 2% to 4% weight of acrylamide polymer.

When a soil is processed to agglomerate the solid particles and form stable aggregates which however allow the air to penetrate easily ot the underlying layers through the interstices between the particles and allow them to retain moisture, the amount of aqueous solution of acrylamide polymer used corresponds to a weight of acrylamide polymer calculated on a dry basis per 1000 parts by weight of particulate material of from 0.5 to 5, and preferably from 1 to 3.

To obtain more compact agglomerates however, for example for solidification of building land, for stabilization of soils for drilling purposes, for production of moulding shells, and the like, the quantity of acrylamide polymer may exceed the amount given hereinabove, without exceeding 50 parts and is more usually to 10 to 20 parts by weight of polymer per 1000 parts by weight of particulate material. No advantage is obtained from the use of amounts of acrylamide polymer greater than the above ratios.

The process for agglomeration of particles by the process of the invention is particularly effective when these particles are damp and contain from 2% to 35% of water, in particular from 2% to 15% of water for sand, from 10% to 20% for silt or loam, and from 10% to 35% for clay.

The aggregates obtained are stable in water, even under the action of stirring, and after drying come back to the state of hard aggregates.

The process of the present invention is particularly valuable for the stabilization of soils, namely to improve the structure of poor soils and to maintain the structure of good soils. The aggregates formed from the particles of the soil prevent erosion and restrict surface soil movement under the action of wind or rain; moreover, they permit the soil to breathe. Under these conditions, seed germination and plant growth may be favourably influenced.

Another advantage of the process according to the present invention lies in the fact that it may be applied either after, or during or before seeding of the soil. More particularly, the seeds may be dispersed in the polyacrylamide solution and a stream of this solution is then mixed with a stream of hypochlorite or hypobromite solution, before spraying on the soil. The cross-linking time allows the treatment of a large area of soil before gelation of the mixed solutions occurs.

The invention also includes cross linked polymers of acrylamide produced by the process of the invention and the agglomerates of particulate material which may be produced thereby.

The invention will now be further described with reference to the following examples.

Example 1

25 ml. of a solution containing 1.06% by weight of sodium hypochlorite was added to 200 ml. of an aqueous solution containing 16.9 grams per liter of polyacrylamide having a molecular weight of 600,000.

The mixture was allowed to stand at a temperature of approximately 20° C., while samples of the mixture were taken. The proportion of free hypochlorite in the test samples was determined by iodemetry. The conversion of the polymer is expressed as the percentage proportion of hypochlorite which has reacted compared to the hypochlorite employed and the results are given in Table I below.

TABLE I

| Period (in minutes): | Conversion (percent) |
|---|---|
| 1 | 2 |
| 4 | 15 |
| 10 | 37 |
| 25 | 62 |
| 60 | 75 |
| 100 | 79 |

The appearance of a gel was observed after 10 minutes.

Example 2

25 ml. of an aqueous solution containing 1% by weight of sodium hypochlorite was added to 100 ml. of an aqueous solution containing 10 grams per liter of polyacrylamide having a molecular weight of 800,000, at a temperature of approximately 20° C. The formation of a gel was observed after 9 minutes.

Example 3

The procedure of Example 2 was repeated but with the sodium hypochlorite being replaced by calcium hypochlorite, in a series of tests, and by potassium hypobromite, in another series of tests.

The formation of a gel was observed in all tests after an average of 10 minutes.

Example 4

25 ml. of an aqueous solution containing 1% of weight of sodium hypochlorite was added to 100 ml. of an aqueous solution containing 10 g./l. of a copolymer consisting of 85% of weight of acrylamide and 15% by weight of methyl acrylate, at a temperature of 50° C.

The formation of a gel was observed after approximately 10 minutes.

Example 5

An aqueous solution containing 2% by weight of polyacrylamide having an average molecular weight of 600,000, along with an aqueous solution (12.5 ml.) containing 1% by weight of sodium hypochlorite, were added successively to 1500 grams of sand particles having dimensions smaller than 2 mms. and containing 10% by weight of water.

Three tests were performed, while employing increasing quantities of polymer solution, but while keeping the quantity of solution of sodium hypochlorite constant.

The results of these tests are shown in the following table:

TABLE II

| Quantity of solution of polyacrylamide, ml. | Weight in g. of polymer per 1,000 g. of particles (anhydrous) | Degree of agglomeration, percent |
|---|---|---|
| 50 | 0.33 | 5 |
| 150 | 0.99 | 58 |
| 300 | 1.98 | 78.5 |

The above results show that the degree of agglomeration (percentage proportion of particles agglomerated into aggregate sizes exceeding 2 mms.), increases as a function of the quantity of polymer added. A maximum value of agglomeration is obtained if the weight of polymer per 1000 parts by weight of particles is close to 2.

Example 6

A series of tests were carried out by adding, in each test, 75 ml. of an aqueous solution containing 2% by weight of polyacrylamide and 12.5 ml. of an aqueous solution of sodium hypochlorite to 1500 g. of particles of sand containing 8% by weight of water.

The concentration of sodium hypochlorite in the solution of hypochlorite was varied in each of the tests.

The results of the tests are shown in the following table:

TABLE III

| Concentration of the aqueous NaOCl solution percent: | Degree of agglomeration, percent |
|---|---|
| 1 | 58 |
| 3 | 58 |
| 5 | 14.5 |
| 10 | 5.2 |

An increase in the concentration of the hypochlorite in the aqueous hypochlorite solution results in a reduction in the degree of agglomeration of the particles.

Example 7

1500 g. of silt was processed with 150 ml. of an aqueous solution containing 2% by weight of polyacrylamide and 12.5 ml. of aqueous solution containing 5% by weight of sodium hypochlorite.

The degree of agglomeration amounted to 34% with the dry silt.

An analogous test, but with silt containing 15% by weight of water, resulted in a degree of agglomeration of 79.5%.

Example 8

A sandy soil having a moisture content of the order of 8% to 10% was processed by spraying with an aqueous solution of polyacrylamide and an aqueous solution containing approximately 2.5% by weight of sodium hypochlorite, the aqueous solution penetrating to a depth of 2 to 10 cms.

Approximately 3 liters of solution containing 2% of polyacrylamide was employed by a square meter of soil processed, and a soil was obtained having an aerated crumbly structure. After sampling, a degree of agglomeration of 58% and a stability index of 0.74 were observed.

The stability index is that defined by Professor de Boodt "Mededelinger van de landbouwhogeschool en de opzoekingestatione van de Staat te Gent" 1958,, Deel XXIII, No. 2, pages 497–507. This index is the difference in millimeters of the mean diameter as determined between the stable aggregates of the dry soil and the stable aggregates of the same humidified soil. The more stable the aggregate, the smaller the stability index.

Example 9

The operation of Example 8 was repeated, but 1 to 2 liters of aqueous solution containing 4% of polyacrylamide was employed per square meter of soil.

A degree of agglomeration of 62% of a stability index of 0.82, were obtained.

Smaller quantities of solution of polyacrylamide may be employed by incorporating such solutions in a layer of no more than 2 to 3 cms., which is sufficient to stabilize the soil against erosion by rain or wind.

Generally, solutions of 1 to 4% by weight (calculated as a dry basis) of acrylamide polymers will be employed and in amounts of 0.5 to 5 liters per square meter of ground.

The earths thus processed can be seeded successfully before, during or after the treatment described hereinabove.

Example 10

200 liters of a 2% polyacrylamide solution and 20 liters of a 1.5% MaOCl solution were mixed in a 250 liter tank. The mixture was sprayed on sand dunes using a centrifugal pump at a rate of 1.5 liter square meter. The cross-linking took place 20 minutes after the time of mixing. Impregnation of the sand was good and the dunes resisted wind erosion.

Example 11

4000 liters of a 2% polyacrylamide solution and 400 liters of a 1.5% NaOCl solution were stored in a tank car equipped with at least two separate compartments. In the compartment containing the polymer solution 20 kilograms of grass seed are dispersed. During the application to the soil, the polymer solution was mixed with the hypochlorite solution in a ratio of 10:1. This was done by using two pumps delivering a constant volume of each of the solutions per time unit. The two streams of solutions were brought together into an applicator, 20 cm. before passing through a spraying nozzle. About 2 liters of mixed product were used per square meter of soil.

This system was used in a particular case where the land had an inclination of 70°. Gelation took place in 20 minutes. The seeds stayed perfectly in place and germination was normal. No erosion and no surface soil movement was observed after 3 days of heavy rain.

What is claimed is:

1. A process for cross-linking polymers of acrylamide consisting essentially of mixing an aqueous solution of an acrylamide polymer selected from the group consisting of homopolyacrylamide and copolymers containing a major proportion of acrylamide monomer and a minor proportion of a monomer copolymerizable therewith, said acrylamide polymer having a molecular weight of from about 50,000 to about 1,500,000, with an aqeous solution of a salt selected from the group consisting of the hypochlorite and hypobromite salts of alkali and alkaline-earth metals, said aqueous solution containing from 0.5% to 10% by weight of said salt and having a pH of from about 5 to about 11, at a temperature of from 0° C. to about 100° C. for a period of time sufficient for a gel to form.

2. The process according to claim 1, wherein the weight ratio between the acrylamide polymer and the salt is from about 1:1 to about 20:1.

3. The process according to claim 1, wherein the pH of the aqueous salt solution is from about 6 to about 10.5.

4. The process according to claim 1, wherein the aqueous salt solution contains from about 1 to about 3% by weight of said salt.

5. The process according to claim 1, wherein the weight ratio between the acrylamide polymer and the salt is from about 10:1 to about 20:1.

6. The process according to claim 1, wherein said aqueous solution of polymer contains from about 1 to about 10% by weight of said polymer.

7. The process according to claim 1, wherein said salt is selected from the group consisting of sodium hypochlorite and sodium hypobromite.

8. The process according to claim 1, wherein said process is carried out at a temperature of from about 10° C. to about 30° C.

9. The process according to claim 1, wherein the cross-linking is carried out in the presence of particulate material in order to produce a bulkier aggregate, the particulate material being mixed with said aqueous acrylamide solution and said aqueous salt solution in an amount such that there is 0.5 to 50 parts by weight of acrylamide polymer on a dry basis per 1,000 parts by weight of particulate material.

10. The process according to claim 9, wherein said particulate material is soil.

11. The process according to claim 10, wherein said soil contains from about 2% to about 35% moisture.

12. The process according to claim 11, wherein said cross-linking is carried out at a temperature of from about 10° C. to about 30° C.

References Cited
UNITED STATES PATENTS 3,619,358  11/1971  Yoshii _____ 260—17.4 CL

FOREIGN PATENTS 2,998  4/1956  Japan.

ALLAN LIEBERMAN, Primary Examiner

P. R. MICHL, Assistant Examiner

47—9; 260—41 A, 89.7 S, DIG 31